3,113,829
METHOD OF MAKING PEARLIZED PLASTICS
Frank E. Porter, Rainbow Lakes, N.J., assignor to Quality Pearl Products Corp., Newark, N.J., a corporation of New Jersey
No Drawing. Filed Apr. 18, 1958, Ser. No. 729,236
9 Claims. (Cl. 18—58)

For many years, so-called mother-of-pearl buttons were produced exclusively from natural shell, but at the present time pearlized buttons are in large part made from plastics, both thermoplastic and thermosetting. By far the largest volume are made from blanks which are cut or blanked from solid plastic sheets.

The plastic materials used for buttons are pearlized by the addition of "pearl essence" to the molding compound. The pearl essence may be either "natural" essence which is pearl essence made directly from fish scales, or "synthetic" essence made of various metallic based crystals and of generally similar physical properties. The so-called "pearl essence," whether natural or synthetic, consists of finely divided, highly lustrous flakes or crystals.

The pearl essence is added to the plastic molding compound before filling the molds in which the sheets are cast and variations in the appearance of the sheet are produced by varying the quantity and type of essence used and also by controlling the distribution of the essence during the solidification of the compound in the mold. The controlling of this distribution to produce an article of consistent appearance and lustre has always been a problem. After the mold is closed the distribution of the pearl essence is altered by gravity and also by movement of the molding compound during solidification, and no matter how carefully the controls have been established, large variations in the final production have always been apparent.

The primary object of the present invention is to provide a method of distribution of the pearl essence or other additive in the molding compound that will result in the production of identical end products.

A further object of the invention is to provide a method of making pearlized plastic products and material for the manufacture of such products having the characteristics above-described which may be carried out with standard molding equipment such as now used for such products and material and other equipment available on the market and without increase in the cost of manufacture.

Materials such as thermosetting resins of the polyester type are quite suitable for making the pearlized product by my new method. Such materials, which are liquid plastics containing portions of polymeric materials that are of a viscosity too heavy to be evacuated as is, are first heated to a temperature that will reduce the viscosity to its lowest reduction point before polymerizing. At this time pearlizing additives are carefully mixed into the solution with slow agitation to reduce the incorporation of air bubbles. The mixed material is then filtered, evacuated, and catalyzed.

In the casting of semi-finished and finished articles such as sheets of preformed buttons, molds of metal are preferably used. These molds are placed in a heating unit whose temperature may be varied at will. The unit is placed upon a vibrating plate which is equipped with rheostat controls so that the speed and amplitude of the vibrations may be varied at will. The selected pattern can exactly be reproduced by duplicating the manufacturing procedure.

In the casting of flat sheeting, frames are attached to the vibrating plate and casting cells of glass or metal of standard construction are rigidly secured to these frames after loading by conventional procedure.

Variations of the reproducible pattern are obtained by controlling the polymerization cycle and by modifying the speed and amplitude of vibration of the table. To obtain reproducible patterns simulating a mother-of-pearl shell, a slow polymerization speed is used and the vibration amplitude is altered during polymerization. To reproduce patterns of smooth orientation, higher vibration speeds are employed. The effects are readily controlled whether natural essence, synthetic metallic essence, metallic powders or chip or other types of additive are used.

The following is a specific example of the procedure to be followed in carrying out my invention. The liquid polyester material such as now commonly used for making button stock is heated to a temperature of 150° F. and to this material is then added with slow agitation the pearl essence or other additive. For making a smooth pattern pearl button stock, 1% by weight of pearl essence may be used. After the additives have been uniformly incorporated in the liquid polyester the blend is filtered and the trapped gases evacuated in the usual manner. The catalyst, for example 1% of methyl ethyl ketone peroxide, is then added and the material is poured into a mold which has been preheated to approximately 150° F. The mold is then placed upon a vibrating plate and is maintained at a constant speed of vibration until the polymerization has proceeded sufficiently for there to be no further change in the distribution of the additives. The material will reach this condition in about three minutes, at which point vibration may be shut off. Complete polymerization takes place in about twelve minutes, at which time the mold will be opened and the finished article removed.

The vibrating table should have a speed range of 2000–4500 reciprocations per minute with an amplitude range of $1/64$ to $1/32$ of an inch. In the above-described operation the table was adjusted for 3600 vibrations of $1/64$ inch amplitude. The button stock produced consisted of a sheet $1/8$ inch thick flat on one face to form the face of the button and with spaced stems formed on the opposite sides, the buttons being formed by a punching operation in the usual manner. The mold was set on a vibrating table at an angle of about 75° to the horizontal with the flat side of the mold down. The resulting sheet was somewhat translucent and highly lustrous on the smooth side which forms the face of the button.

The appearance of the sheet and the buttons made from the sheet is closely identical with the appearance of buttons made from natural shells. That is to say, the material providing the lustre appears to be at a depth beneath the surface with an overlying transparent portion, and while the particles of the pearl essence are not individually discernible, there is an appearance of waviness in the lustre-giving surface similar to the appearance of natural pearl buttons.

For many purposes, such for example, as small buttons where irregularities such as produce the wavy pattern in the product above-described would result in a lack of uniformity in the appearance of the separate buttons, a more suitable pattern can be produced by reducing the polymerization time through the addition of more catalyst. If the amount of catalyst is increased to 2% the initial polymerization period will be reduced to about one minute. The resulting pattern will be smoother and more uniform so that even small buttons made from the sheet will present no discernible differences in appearance.

A more pronounced pattern may be produced in the sheet or other product by varying the speed or amplitude of vibration, or both, during the initial portion of the polymerization time. The pattern is also affected by the viscosity of the polyester material, which varies from the highly liquid state at the beginning of the initial polymerization period to a thick gel in which the additives become immovable and which is itself immovable in the cell. Apparently as the polyester material increases in viscosity the movement of the pattern-forming additives resulting from the vibrations is modified and the pattern will be affected by the particular moment in the initial polymerization period at which the speed or amplitude of the vibrator is altered. The angle at which the mold is mounted on the vibrating table also modifies the resulting pattern. To produce sheeting of a high metallic lustre the mold is attached to the vibrating table in a vertical position. In this position the pattern-forming material will be oriented in a plane parallel to the casting surface, producing a highly lustrous, semi-transparent sheet. If the cell is attached to the vibrating unit in a horizontal plane the pattern-forming material will lay up at right angles to the casting surface, producing a white semi-opaque sheet containing a very fine "pattern." When the sheet is set as described in the foregoing example at an angle of 75° to the horizontal, a more pronounced mother-of-pearl design results, that is, one which has a greater appearance of depth and a more pronounced waviness of appearance than when the mold is either vertical or horizontal, and this pattern may be varied by varying the polymerization time and the speed and amplitude of vibration of the vibrating unit.

For forming pearlized sheets the conventional glass molds may be used, which molds consist of two sheets of glass separated by a gasket ring around the margin of the glass sheets. These molds are filled in the customary fashion and a number of the molds are supported on the vibrating table in a suitable frame for holding the sheets in the desired angular position, depending upon the characteristics it is desired to impart to the pattern.

The metal molds for forming the sheets with the button shank projections on one side can similarly be attached to the table in a suitable frame. If desired a heating unit can be mounted on a frame and the casting cells or molds supported therein. By this arrangement the polymerization period can be more accurately controlled than when the molds or cells are cooled solely by the dissipation of the heat initially imparted to the molds themselves to the surrounding atmosphere.

The composition of the molding compound given in the specific example is a commonly used composition for materials of this character, and so far as I am aware any of the liquid thermosetting or thermoplastic materials customarily used for molding plastic sheets and articles of the character herein described may be employed instead with comparable results.

It will also be understood that the temperatures specified and the rate and amplitude of the vibrating unit are not critical and that the procedure may be variously modified within the scope of the appended claims.

In the appended claims the term "pearlized plastic products" is used in a generic sense to mean plastic products containing pearl essence or other additives for modifying the appearance of the product by changes in orientation.

I claim:

1. A process of manufacturing pearlized plastic products comprising the following steps: filling a mold with a liquid molding compound containing a suitable additive in the form of discrete particles, subjecting the mold to conditions to effect the solidification of the liquid and vibrating the mold while solidification is taking place to produce a predetermined pattern distribution of the additive particles within the solidified molding compound.

2. The process of claim 1, wherein there is a gradual change in viscosity during solidification and the vibration is maintained during at least a portion of the period of changing viscosity.

3. The process of claim 2, wherein the rate of vibration is changed during said period.

4. The process of claim 1, wherein the liquid molding compound is a polymerizable plastic, and which further comprises adding a polymerizing catalyst to said plastic prior to the filling of the mold, the amount of catalyst added to the plastic being such as to permit a desired distribution of the additive before the plastic has reached a stage of polymerization at which there will be no movement of the additives therein.

5. The process of claim 1, wherein the mold is vibrated at a rate to give said predetermined pattern distribution of the additive in the molding compound.

6. The process of claim 1, wherein the mold is vibrated at an amplitude to give said predetermined pattern distribution of the additive in the molding compound.

7. The process of claim 1, wherein the plastic is a polyester and the additive is pearl essence.

8. The process of claim 1, wherein the product is in sheet form and the plane of the mold is maintained at an angle to the vertical during the period of vibration.

9. The process of claim 1, wherein the product is in sheet form and the plane of the mold is maintained in vertical position during the period of vibration.

References Cited in the file of this patent

UNITED STATES PATENTS

| | | |
|---|---|---|
| 2,382,187 | Vang | Aug. 14, 1945 |
| 2,652,597 | Sucher | Sept. 22, 1953 |
| 2,668,328 | Porter | Feb. 9, 1954 |
| 2,819,046 | Jandris et al. | Jan. 7, 1958 |

FOREIGN PATENTS

| | | |
|---|---|---|
| 508,675 | Great Britain | June 26, 1939 |